(12) United States Patent
Soeda et al.

(10) Patent No.: US 7,196,158 B2
(45) Date of Patent: Mar. 27, 2007

(54) KNITTED/WOVEN FABRIC OF POLYESTER FIBER

(75) Inventors: Tsuyoshi Soeda, Osaka (JP); Shuji Minato, Osaka (JP); Norimitsu Kamiyama, Osaka (JP)

(73) Assignee: Teijin Fibers Limited, Osaka (JP)

( * ) Notice: Subject to any disclaimer, the term of this patent is extended or adjusted under 35 U.S.C. 154(b) by 0 days.

(21) Appl. No.: 10/541,757

(22) PCT Filed: Dec. 24, 2003

(86) PCT No.: PCT/JP03/16627

§ 371 (c)(1),
(2), (4) Date: Jul. 8, 2005

(87) PCT Pub. No.: WO2004/063435

PCT Pub. Date: Jul. 29, 2004

(65) Prior Publication Data

US 2006/0051576 A1    Mar. 9, 2006

(30) Foreign Application Priority Data

| Jan. 9, 2003 | (JP) | ............................. 2003-002878 |
| Jan. 9, 2003 | (JP) | ............................. 2003-002879 |
| Mar. 7, 2003 | (JP) | ............................. 2003-061286 |
| Mar. 11, 2003 | (JP) | ............................. 2003-064811 |

(51) Int. Cl.
*C08G 63/02*    (2006.01)

(52) U.S. Cl. ........................ 528/272; 428/365; 524/706; 524/710; 524/711; 524/713; 524/783; 528/279; 528/286; 528/287; 528/296; 528/300; 528/302; 528/307; 528/308

(58) Field of Classification Search ................ 528/279, 528/286, 287, 296, 300, 302, 307, 308; 524/706, 524/710, 711, 713, 783; 428/365
See application file for complete search history.

(56) References Cited

U.S. PATENT DOCUMENTS

| 4,254,018 A | 3/1981 | Kowallik et al. |
| 6,284,370 B1 * | 9/2001 | Fujimoto et al. ........... 428/364 |
| 6,316,101 B2 * | 11/2001 | Kato et al. ................. 428/364 |

FOREIGN PATENT DOCUMENTS

| EP | 1 156 070 A1 | 11/2001 |
| JP | 54-43295 A | 4/1979 |
| JP | 54-45397 A | 4/1979 |
| JP | 2000-319370 A | 11/2000 |
| JP | 2001-278971 A | 10/2001 |
| JP | 2003-160655 A | 6/2003 |
| JP | 2003-160656 A | 6/2003 |
| JP | 2003-293222 A | 10/2003 |

* cited by examiner

*Primary Examiner*—Terressa Boykin
(74) *Attorney, Agent, or Firm*—Sughrue Mion, PLLC

(57) ABSTRACT

A knitted/woven fabric of polyester fibers is produced from a polyester polymer obtained by condensation-polymerizing an aromatic dicarboxylate in the presence of a catalyst which comprises a mixture of a titanium compound ingredient (A) comprising a titanium alkoxide and at least one product of the reaction of the titanium alkoxide with a specific carboxylic acid or anhydride thereof and a specific phosphorus compound ingredient (B) and/or comprises a product of the reaction of a titanium compound ingredient (C) with a specific phosphorus compound ingredient (D). The knitted/woven fabric obtained has a satisfactory color tone (low value of b*) and is excellent in suitability for knitting/weaving and dyeability.

6 Claims, No Drawings

KNITTED/WOVEN FABRIC OF POLYESTER FIBER

TECHNICAL FIELD

The present invention relates to a polyester fiber knitted or woven fabric. More particularly, the present invention relates to a polyester fiber knitted or woven fabric formed from a polyester resin having a good color tone and an excellent formability.

BACKGROUND ART

It is well known that polyester resins, particularly polyethylene terephthalate, polyethylene naphthalate, polytrimethylene terephthalate and polytetramethylene terephthalate have excellent mechanical, physical and chemical properties, and thus are widely utilized for fibers, films and other shaped articles and, particularly, for knitted and woven fabrics, the polyester resin products have excellent mechanical strength, dimensional stability, heat resistance and light resistance.

Each of the above-mentioned polymers for fibers, for example polyethylene terephthalate, is usually produced by, for example, preparing a ethylene glocol ester of terephthalic acid and/or an oligomer thereof, and then polycondensation-reacting the ester monomer or oligomer in the presence of a polycondensation catalyst under a reduced pressure while heating the reaction system until a desired degree of polymerization of the resultant polyester resin is attained. Other polyesters can be produced by procedures similar to the above-mentioned procedures.

With respect to the procedures, it is well known that the quality of the resultant polyester resin is greatly influenced by the type of the polycondensation catalyst and, as a polycondensation catalyst for polyethylene terephthalate, antimony compounds are most widely employed.

However, when an antimony compound is used as the polycondensation catalyst, there arises the following problem. That is, when the resulting polyester is continuously melt-spun for a long time, around a spinneret for melt spinning, foreign matter (hereinafter sometimes merely referred to as spinneret foreign matter) is deposited thereby to cause a bending phenomenon of a molten polymer stream extruded through the spinneret, which leads to the occurrence of fuzz and/or breakage of fiber yarns obtained in the spinning step and/or the drawing step. Particularly, in the production of filaments (of which the performances must be utilized to the maximum extent), the above-mentioned problem must be solved.

To solve the problem, it is known to use a titanium compound, for example, titanium tetrabutoxide as a polycondensation catalyst. In this case, however, the resultant polyester polymer exhibits a low thermal stability and, when melted, the polymer is significantly deteriorated. Therefore the production of the polyester filaments having high mechanical strength is difficult. Also, there arises a problem that the resultant polyester polymer is colored yellow, and the finally resultant fibers exhibit an unsatisfactory color tone.

As means for solving the problem, it is disclosed in, for example, Japanese Examined Patent Publication No. 59-46258, that a product obtained by reacting a titanium compound with trimellitic acid is used as a catalyst for preparation of a polyester, and in, for example, Japanese Unexamined Patent Publication No. 58-38722, that a product obtained by reacting a titanium compound with a phosphite ester is used as a catalyst for producing a polyester. Although the thermal stability of the melt of the polyester is certainly improved to some extent by this processes, the degree of improvement is insufficient and the resulting polyesters have insufficient color tone. Therefore, a further improvement in the color tone of the polyester is required.

Furthermore, Japanese Unexamined Patent Publication (Kokai) No. 7-138354 proposes use of a complex of a titanium compound with a phosphorus compound as a catalyst for the preparation of a polyester. Although the thermal stability of the melt of the polyester is certainly improved to some extent by this process, the degree of improvement is still insufficient and the color tone of the resulting polyester must be further improved.

DISCLOSURE OF THE INVENTION

An object of the present invention is to provide a polyester fiber knitted or woven fabric formed from polyester fibers having a good color tone (a high L* value and a low b* value) and a high quality.

The polyester fiber knitted or woven fabric of the present invention is one formed from yarns comprises polyester fibers comprising, as a principal component, a polyester polymer which has been produced by polycondensing an aromatic dicarboxylate ester in the presence of a catalyst, wherein the catalyst comprises at least one member selected from mixtures (1) and reaction products (2);

(1) the mixtures (1) for the catalyst comprise a titanium compound component (A) mixed with phosphorus compound component (B), in which mixtures (1), the component (A) comprises at least one member selected from the group consisting of (a) titanium alkoxides represented by the general formula (I):

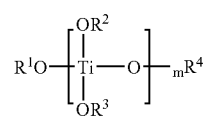

(I)

in which formula (I), $R^1$, $R^2$, $R^3$ and $R^4$ respectively and independently from each other represent a member selected from alkyl groups having 1 to 20 carbon atoms and a phenyl group, m represent an integer of 1 to 4, and when m represents an integer of 2, 3 or 4, the 2, 3 or 4 $R^2$s and $R^3$s may be respectively the same as each other or different from each other, and (b) reaction products of the titanium compounds of the general formula (I) with aromatic polycarboxylic acids represented by the formula (II):

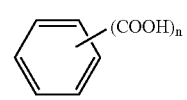

(II)

in which formula (II), n represents an integer of 2 to 4, or anhydrides of the acids of the formula (II); and the component (B) comprising at least one phosphorus compound represented by the general formula (III):

(III)

in which formula (III), $R^5$, $R^6$ and $R^7$ respectively and independently from each other represent an alkyl group having 1 to 4 carbon atoms, X represents a member selected from a —$CH_2$— group and a —CH(Y)— group (wherein Y represents a phenyl group), the mixture (1) for the catalyst for the polycondensation being employed in an amount satisfying the requirements represented by the following expressions of relation (i) and (ii):

$$1 \leq M_P/M_{Ti} \leq 15 \quad \text{(i)}$$

and $$10 \leq M_P + M_{Ti} \leq 100 \quad \text{(ii)}$$

wherein $M_{Ti}$ represents a ratio in % of a value in milli mole of titanium element contained in the titanium compound component (A) to a value in mole of the aromatic dicarboxylate ester, and $M_p$ represents a ratio in % of a value in milli mole of phosphorus element contained in the phosphorus compound component (A) to the value in mole of the aromatic dicarboxylate ester, (2) the reaction products (2) for the catalyst comprises a component (C) reacted with a component (D), in which reaction products (2), the component (C) comprises at least one member selected from the group consisting of (C) titanium alkoxides represented by the general formula (IV):

(IV)

in which formula (IV), $R^8$, $R^9$, $R^{10}$ and $R^{11}$ respectively and independently from each other represents an alkyl group having 1 to 20 carbon atoms, p represents an integer of 1 to 3, and when p represents an integer of 2 or 3, 2 or 3 $R^9$s and $R^{10}$s may be respectively the same as each other or different from each other, and (d) reaction products of the titanium alkoxides of the general formula (IV) with aromatic polycarboxylic acids represented by the above-mentioned general formula (II) or anhydrode of the acids; and the component (D) comprises at least one phosphorus compound represented by the general formula (V):

(V)

in which formula (V), $R^{12}$ represents an alkyl group having 1 to 20 carbon atoms or an aryl group having 6 to 20 carbon atoms, and q represents an integer of 1 or 2.

In the polyester fiber knitted or woven fabric of the present invention, and preferably in each of the component (A) of the mixture (1) and the component (C) of the reaction products (2) for the catalyst, a reaction molar ratio of each of titanium alkoxides (a) and (c) to the aromatic polycarboxylic acid of the general formula (II) or the anhydride thereof is in the range of from 2:1 to 2:5.

In the polyester fiber knitted or woven fabric of the present invention, and preferably in the reaction product (2) for the catalyst, a reaction amount ratio of the component (D) to the component (C) is in the range of, in terms of ratio (P/Ti) of the molar amount of phosphorus atoms contained in the component (D) to the molar amount of titanium atoms contained in the component (C), from 1:1 to 3:1.

In the polyester fiber knitted or woven fabric of the present invention, the phosphorus compound of the general formula (V) for the reaction product (2) is preferably selected from monoalkyl phosphates.

In the polyester fiber knitted or woven fabric of the present invention, the dialkyl aromatic dicarboxylate ester is preferably produced by a transesterification reaction of a dialkyl ester of an aromatic dicarboxylic acid with an alkylene glycol.

In the polyester fiber knitted or woven fabric of the present invention, the aromatic dicarboxylic acid is preferably selected from terephthalic acid, 1,2-naphthalene dicarboxylic acid, phthalic acid, isophthalic acid, diphenyldicarboxylic acid and diphenoxyethane dicarboxylic acid and the alkylene glycol is preferably selected from ethylene glycol, butylene glycol, trimethylene glycol, propylene glycol, neopentyl glycol, hexamethylene glycol and dodecamethylene glycol.

In the polyester fiber knitted or woven fabric of the present invention, the polyester polymer preferably has an L* value of 77 to 85 and a b* value of 2 to 5, determined in accordance with the L*a*b* color specification of JIS Z 8729.

BEST MODE FOR CARRYING OUT THE INVENTION

The polyester fiber knitted or woven fabric of the present invention is formed from polyester fibers comprising, as a principal component, a polyester polymer.

The polyester polymer is one prepared by polycondensing an aromatic dicarboxylate ester in the presence of a catalyst. The polycondensation catalyst comprises at least one member selected from mixtures (1) of a titanium compound component (A) with a phosphorous compound component (B) as specified below and reaction products of a titanium compound component (C) and a phosphorus compound component (D) as specified below.

The titanium compound component (A) for the mixture (1) for the polycondensation catalyst comprises at least one member selected from the group consisting of:

(a) titanium alkoxides represented by the general formula (I):

(I)

in which formula (I), $R^1$, $R^2$, $R^3$ and $R^4$ respectively and independently from each other represent a member selected from alkyl groups having 1 to 20 carbon atoms, preferably 1 to 6 carbon atoms, and a phenyl group, m represents an integer of 1 to 4, preferably 2 to 4, and when m represents an integer of 2, 3 or 4, the 2, 3 or 4 $R^2$s and $R^3$s may be respectively the same as each other or different from each other, and (b) reaction products of the titanium compounds of the general formula (I) with aromatic polycarboxylic acids represented by the general formula (II):

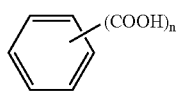

(II)

in which formula (II), n represents an integer of 2 to 4, preferably 3 or 4, or anhydrides of the acids of the formula (II).

The phosphorous compound component (B) for the mixture (1) for the polycondensation catalyst comprises at least one compound represented by the general formula (III):

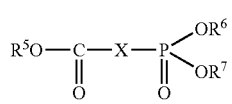

(III)

in which formula (III), $R^5$, $R^6$ and $R^7$ respectively and independently from each other represent an alkyl group having 1 to 4 carbon atoms, X represents a member selected from a —$CH_2$— group and a —CH(Y)— group (wherein Y represents a phenyl group).

Also, the titanium compound component (C) for the reaction products (2) for the polycondensation catalyst comprises at least one member selected from the group consisting of:

(c) titanium alkoxides represented by the general formula (IV):

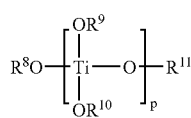

(IV)

in which formula (IV), $R^8$, $R^9$, $R^{10}$ and $R^{11}$ respectively and independently from each other represents an alkyl group having 1 to 20 carbon atoms, and preferably 1 to 6 carbon atoms, p represents an integer of 1 to 3, and preferably 1 to 2, and when p represents an integer of 2 or 3, 2 or 3 $R^9$s and $R^{10}$s may be respectively the same as each other or different from each other, and (d) reaction products of the titanium alkoxides of the general formula (IV) with aromatic polycarboxylic acids represented by the above-mentioned general formula (II) or anhydrode of the acids.

The phosphorus compound component (D) for the reaction products (2) for the polycondensation catalyst comprises at least one compound represented by the general formula (V):

(V)

in which formula (V), $R^{12}$ represents an alkyl group having 1 to 20 carbon atoms or an aryl group having 6 to 20 carbon atoms, and q represents an integer of 1 or 2.

In the case where mixtures (1) of a titanium compound component (A) with a phosphorous compound component (B), or reaction products of a titanium compound component (C) with a phosphorous compound component (D) are employed, as polycondensation catalysts, the titanium alkoxide (a) or (c) represented by the general formula (I) or (IV) and usable for the titanium compound component (A) or (C), and the reaction product (b) or (d) of titanium alkoxide (a) or (c) with an aromatic polycarboxylic acid represented by the general formula (II) or with an anhydride thereof, have a high solubility in or a high affinity to the polyester polymer, and thus the catalyst comprising the mixture (1) or reaction product (2) exhibits a high solubility in or a high affinity to the polyester polymer, which is sufficient in practice. Therefore, even if the mixture (1) or reaction product (2) for the catalyst remains in the polyester polymer produced by the polycondensation procedure, and the polyester polymer is melt-spun, no foreign matter is accumulated around the spinneret for melt spinning, and thus polyester filaments having a high quality can be produced with high melt-spinning efficiency.

The titanium alkoxide (a) of the general formula (I) usable for the titanium compound component (A) for the polycondensation catalyst is preferably selected from titanium tetraisoproxide, titanium tetraproxide, titanium tetra-n-butoxide, titanium tetraethoxide, titanium tetraphenoxide, octaalkyl trititanates and hexaalkyl dititanates.

The titanium alkoxide (C) of the general formula (IV) usable for the titanium compound component (C) for the polycondensation catalyst is preferably selected from titanium tetraalkoxides, for example, titanium tetrabutoxide, titanium tetraisopropoxide, titanium tetrapropoxide, and titanium tetraethoxide; and alkyl titanates, for example, octaalkyl trititanates and hexaalkyl dititonates. Particularly, titanium tetrabutoxide, which has a high reactivity with the phosphorus compound component, is preferably used.

The aromatic polycarboxylic acids of the general formula (II) and the anhydrides thereof, to be reacted with the titanium alkoxides (a) or (c) are preferably selected from phthalic acid, trimellitic acid, hemimellitic acid, pyromellitic acid and anhydrides of the above-mentioned acids. Particularly, when trimellitic anhydride is used, the resultant reaction product (b) exhibits a high affinity to the polyester polymer and thus contributes to preventing the accumulation of the foreign matter.

To react the titanium alkoxide (a) or (c) with the aromatic polycarboxylic acid of the general formula (II) or the anhydride thereof, preferably, the aromatic polycarboxylic acid or the anhydride thereof is dissolved in, for example, a solvent; to the resultant mixed liquid, a titanium alkoxide (a) or (c) is added dropwise; and the mixture is heated at a temperature of 0 to 200° C. for at least 30 minutes. The above-mentioned solvent is optionally selected from ethyl alcohol, ethyleneglycol, trimethyleneglycol, tetramethyleneglycol, benzene and xylene.

There is no limitation to the molar ratio for the reaction of the titanium alkoxide (a) or (c) to the aromatic polycarboxylic acid of the general formula (II) or the anhydride thereof. However, if the proportion of the titanium alkoxide is too high, the resultant polyester polymer may have a degraded color tone and/or too low a softening point. On the contrary, if the proportion of the titanium alkoxide is too low, the reaction rate of the polycondensation may decrease. Accordingly, the reaction molar ratio of the titanium alkoxide (a) or (c) to the aromatic polycarboxylic acid of the general formula (II) or the anhydric thereof is preferably in the range of from (2:1) to (2:5).

The reaction product (b) or (d) produced by the abovementioned reaction may be employed without refining or after refining by recrystallization thereof by using acetone, methyl alcohol and/or ethyl acetate.

In the present invention, the phosphorus compound (phosphonate compounds) of the general formula (III) usable for the phosphorus compound component (B) for the mixture (1) for the polycondensation catalyst is preferably selected from esters of phosphonic acid derivatives, for example, dimethyl esters, diethyl esters, dipropyl esters and dibutyl esters of phosphonic acid derivatives, for example, carbomethoxymethanephosphonic acid, carboethoxymethanephosphonic acid, carbopropoxymethanephosphonic acid, carbobutoxymethanephosphonic acid, carboxyphenylmethanephosphonic acid, carboethoxyphenylmethanephosphonic acid, carbopropoxyphenylmethanephosphonic acid, and carbobutoxyphenylmethanephosphonic acid.

When the phosphorus compound component (B) comprising the phosphorus component (phosphonate compound) of the general formula (III) is employed for the polycondensation reaction of the aromatic dicarboxylate ester, the reaction thereof with the titanium compound component (A) can proceed at a relatively slow reaction rate compared with a conventional phosphorus compound which is usually used as a conventional stabilizer and, thus, during the polycondensation procedure, the catalytic activity of the titanium compound component (A) can be maintained high for a long time. Therefore, as a result, the amount ratio of the titanium compound component (A) to the aromatic dicarboxylate ester in the polycondensation system can be made low. Also, even if the polycondensation system containing the phosphorus compound component (B) comprising the phosphorus compound of the general formula (III) is added with a large amount of a stabilizer, the thermal stability of the resultant polyester polymer is not decreased and the color tone of the polyester polymer is not affected.

In the present invention, in the case where the mixture (1) is employed for the polycondensation catalyst, the mixture (1) is employed in an amount satisfying the requirements represented by the following expressions of relation (i) and (ii):

$$1 \leq M_p/M_{Ti} \leq 15 \quad (i)$$

and $$10 \leq M_p + M_{Ti} \leq 100 \quad (ii)$$

wherein $M_{Ti}$ represents a ratio in % of a value in milli mole of titanium element contained in the titanium compound component (A) to a value in mole of the aromatic dicarboxylate ester, and $M_p$ represents a ratio in % of a value in milli mole of phosphorus element contained in the phosphorus compound component (A) to the value in mole of the aromatic dicarboxylate ester.

The ratio $M_p/M_{Ti}$ is 1 or more but not more than 15, preferably 2 or more but not more than 10. If the ratio $M_p/M_{Ti}$ is less than 1, the resultant polyester polymer may have a yellowish color tone, and if the ratio is more than 15, the resultant polycondensation catalyst may exhibit an insufficient proportion effect on the polycondensation reaction, and thus the target polyester polymer may be difficult to produce. The range of the ratio $M_p/M_{Ti}$ usable for the present invention is narrower than that of the conventional Ti—P catalyst system. By establishing the ratio $M_p/M_{Ti}$ in the above-mentioned range, an excellent catalytic effect, which has not been obtained in the conventional Ti—P catalyst system, can be obtained.

The sum of $(M_{Ti}+M_p)$ is 10 or more but not more than 100, preferably 20 or more but not more than 70. If the sum of $(M_{Ti}+M_p)$ is less than 10, the resultant polyester polymer exhibits an insufficient fiber-forming property, the production efficiency in the melt-spinning procedure is insufficient, and the resultant fibers exhibit an unsatisfactory performances. Also, if the sum of $(M_{Ti}+M_p)$ is more than 100, and when the resultant polyester polymer is melt-spun, foreign matter is accumulated in a small amount around the spinneret. Generally, the $M_{Ti}$ value is preferably 2 to 15% and more preferably 3 to 10%.

In the case where the reaction products (2) are used as a polycondensation catalyst for the present invention, the phosphorus compounds of the general formula (V) for the phosphorus compound component (D) include, for example, monoalkyl phosphates, for example, mono-n-butyl phosphate, monohexyl phosphate, monododecyl phosphate, monolauryl phosphate, monooleyl phosphate, etc.; monoaryl phosphates, for example, monophenyl phosphate, monobenzyl phosphate, mono(4-ethylphenyl) phosphate, monobiphenyl phosphate, mononaphthyl phosphate, monoanthoryl phosphate, etc.; dialkyl phosphates, for example, diethyl phosphate, dipropyl phosphate, dibutyl phosphate, dilauryl phosphate, dioleyl phosphate, etc; and diaryl phosphates, for example, diphenyl phosphate, etc. Among these phosphate compounds, the monoalkyl phosphates or monoaryl phosphates of the formula (V) in which q is one, are preferably employed.

The phosphorus compound component (D) usable for the present invention may consist of a mixture of two or more phosphorus compounds of the general formula (V). For example, a mixture of a monoalkyl phosphate with a dialkyl phosphate and a mixture of a monophenyl phosphate with a diphenyl phosphate are preferably employed. Particularly, in the mixture, a monoalkyl phosphate is preferably contained in an amount of 50% by mass or more, more preferably 90% by mass or more, based on the total mass of the mixture.

The reaction products of the titanium compound component (C) with the phosphorus compound component (D) can be produced by, for example, mixing the components (C) and (D) with each other and heating the resultant mixture in glycol. Namely, when a glycol solution containing the titanium compound component (C) and the phosphorus compound component (D) is heated, the glycol solution becomes cloudy white and the reaction product of the components (C) and (D) with each other is precipitated as a precipitate. The precipitate is collected and used as a catalyst for the production of the polyester polymer. In the production of the reaction product (2) for the catalyst, the glycol to be used is preferably the same as that used as a glycol component for the polyester polymer to be produced by using the resultant catalyst. For example, in the case where the target polyester polymer is polyethylene terephthalate polymer, ethylene glycol is used, in the case of polytrimethylene terephthalate polymer, 1,3-propanediol is used, and in the case of polytetramethylene terephthalate polymer, tetramethyleneglycol is used.

The reaction product (2) for the polycondensation catalyst for the present invention can be produced by mixing the titanium compound component (C), the phosphorus compound component (D) and glycol altogether and heating the mixture. In this method, however, when the mixture is heated, a reaction product, insoluble in glycol, is produced by the reaction of the titanium compound component (C) with the phosphorus compound component (D) and precipitate in the reaction system. Therefore, the reaction procedure until the precipitation is preferably carried out uniformly. Accordingly, to produce the reaction product precipitate with a high efficiency, preferably a solution of the titanium compound components in glycol and a solution of the phosphorus compound component (D) are separately prepared, and these solutions are mixed together and heated.

The reaction temperature of the components (C) and (D) is preferably in the range of from 50° C. to 200° C., and the reaction time is preferably one minute to 4 hours. If the reaction temperature is too low, the reaction may be incompletely effected or a very long reaction time is needed, and thus the target reaction product precipitate may not be obtained by a uniform reaction with a high efficiency.

The phosphorus compound component (D) and the titanium compound component (C) are preferably subjected, in a ratio, in terms of molar ratio of phosphorus atoms to titanium atoms, of 1.0 to 3.0, more preferably 1.5 to 2.5, to the heat-reaction. When the components (D) and (C) are employed in the above-mentioned ratio, the phosphorus compound component (D) can be substantially completely reacted with the titanium compound component (C), and substantially no incompletely reacted product is present in the reaction product. Therefore, the resultant reaction product can be used for the catalyst without refining, and the resultant polyester polymer has a good color tone. Also, as the reaction product contains substantially no unreacted phosphorus compound of the formula (V), the polycondensation reaction for the production of the polyester can be conducted with a high productivity and without obstruction due to the non-reacted phosphorus compound.

The reaction product (2) for the polycondensation catalyst usable for the present invention preferably contains the compound represented by the general formula (VI):

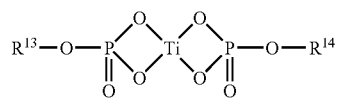

(VI)

In the formula (VI), $R^{13}$ and $R^{14}$ respectively and independently from each other represent a member selected from alkyl groups having 1 to 10 carbon atoms and derived from the $R^8$, $R^9$, $R^{10}$ and $R^{11}$ groups in the general formula (IV) which represents the titanium alkoxide for the titanium compound component (C) and $R^{12}$ in the general formula (V) which represents the phosphorus compound for the phosphorus compound component (D), or aryl groups having 6 to 12 carbon atoms and derived from the $R^{12}$ group of the phosphorus compound of the formula (V).

The reaction product of the titanium compound with the phosphorous compound of the formula (V), represented by the formula (VI), has a high catalytic activity and the polyester polymer produced by using this reaction product exhibits a good color tone (a low b* value), and contains acetaldehyde, residual metals and cyclic trimers in sufficiently low amounts in practice and has practically satisfactory polymer properties. The reaction product represented by the formula (IV) is preferably contained in a content of 50% by mass or more, more preferably 70% by mass or more, in the polycondensation catalyst.

In the polycondensation of the aromatic dicarboxylate ester in the presence of the above-mentioned reaction product (2), the precipitate of the reaction product (2) suspended in glycol can be employed as a catalyst without separating the precipitate from glycol. Alternately, the reaction product precipitate is separated from the suspension thereof in glycol by a centrifugal precipitation treatment or a filtration treatment, the separated reaction product is refined by a recystallization treatment in a recrystallizing agent, for example, acetone, methyl alcohol and/or water, then the refined product is employed as a poly-condensation catalyst. The chemical structure of the reaction product (2) for the polycondensation catalyst can be confirmed by a metal quantitative determination according to solid NMR and XMA.

The polyester polymer usable for the present invention is produced by a polycondensation of an aromatic dicarboxylate ester in the presence of a catalyst comprising a mixture (1) of the titanium compound component (A) with the phosphorus compound (phosphonate compound) component (B) and/or a reaction product (2) of the titanium compound component (C) with the phosphorus compound component (D). In the present invention, the aromatic dicarboxylate ester is preferably a diester of an aromatic dicarboxylic acid component with an aliphatic glycol component.

The aromatic dicarboxylic acid component preferably comprises, as a principal component, terephthalic acid. More particularly, the terephthalic acid is contained in a content of 70 molar % or more on the basis of the total content of the aromatic dicarboxylic acid component. The preferable aromatic discarboxylic acids other than terephthalic acid for the present invention include, for example, phthalic acid, isophthalic acid, naphthalene dicarboxylic acid, diphenylldicarboxylic acid and diphenoxyethane dicarboxylic acid.

The aliphatic glycol component preferably comprises an alkylene glycol, for example, ethylene glycol, trimethylene glycol, propylene glycol, tetramethylene glycol, neopentyl glycol, hexamethylene glycol, dodecamethylene glycol, etc. Among them, ethylene glycol is more preferably employed. In the present invention, the polyester polymer is preferably selected from polyester polymers having, as principal repeating units, ethylene terephthalate groups formed from terephthalic acid and ethylene glycol. In this case, the repeating ethylene terephthalate units are preferably contained in a content of 70 molar % or more based on the total molar amount of the repeating units.

The polyester polymer usable for the present invention may be selected from copolyester polymers containing comonomer components, as acid components or diol components, capable of forming the polyester structure.

The carboxylic acid components for the copolyester include difunctional carboxylic acids, such as the above-mentioned aromatic dicarboxylic acids aliphatic dicarboxylic acids, for example, adipic acid, sebasic acid, azelaic acid and decanedicarboxylic acid, and cycloaliphatic dicarboxylic acids, for example, cyclohexanedicarboxylic acid, and ester-forming derivatives of the difunctional carboxylic acids. Also, the diol components for the copolyester include the above-mentioned aliphatic diols, cycloaliphatic glycol compounds, for example, cyclohexane diol, and aromatic diol compounds, for example, bisphenol, hydroquinone, and 2,2-bis(4-β-hydroxyethoxyphenyl) propane.

Further, copolyester polymers produced by copolymerizing a copolymerization component comprising polyfunctional compounds, for example, trimesic acid, trimethylolethane, trimethylolpropane, trimethylolmethane and pentaerythriol, can be used for the present invention.

In the present invention, the homopolyester polymers and the copolyester polymers may be employed alone or in a mixture of two or more thereof.

For the polyester polymer for the polyester fiber fabric of the present invention, polycondensation products of aromatic dicarboxylate ester produced from the above-mentioned aromatic dicarboxylic acid and aliphatic glycol are preferably used. The aromatic dicarboxylate ester can be produced by a diesterification reaction of the aromatic dicarboxylic acid with the aliphatic glycol, or by a transesterification reaction of a dialkylester of the aromatic dicarboxylic acid with an aliphatic glycol. The production of the polyester polymer through the transesterification reaction using, as a starting compound, the dialkyl ester of the aromatic dicarboxylate, is advantageous in that the polycondensation procedure can be carried out with less scattering of the phosphorus compound added as a phosphorus stabilizing agent to the polycondensation system in comparison with the polycondensation procedure of the aromatic dicarboxylate ester produced by the diesterification reaction of the aromatic dicarboxylic acid.

Further, preferably a portion or all of the titanium compound component (A) or (C) is mixed with the reaction system before the start of the transesterification reaction, to utilize the titanium compound component (A) or (C) as a catalyst for both the transesterification and polycondensation reactions. In this utilization of the titanium compound component (A) or (C), the final content of the titanium compound component in the polyester polymer can be reduced. Particularly, in the production of, for example, polyethylene terephthalate, the transesterification reaction of a dialkyl ester, of an aromatic dicarboxylic acid component including, as a principal component, terephthalic acid, with ethylene glycol is preferably carried out in the presence of the titanium compound component (A) comprising at least one member selected from the group consisting of titanium alkoxides (a) represented by the general formula (I), and reaction products (b) produced by a reaction of the titanium alkoxides represented by the general formula (I) with an aromatic polycarboxylic acids represented by the general formula (II) or anhydrides thereof. Then, the reaction mixture produced by the transesterification reaction and containing the diester of the aromatic dicarboxylic acid with ethylene glycol is added with a phosphorous compound (phosphate component) component (B) represented by the general formula (III), or with a reaction product of the titanium compound component (C) with the phosphorous compound component (D), to proceed the polycondensation reaction of the aromatic dicarboxylate ester.

Usually the transesterification reaction is carried out under the ambient atmospheric pressure. When the reaction is carried out under a pressure of 0.05 to 0.20 MPa, a transesterification reaction due to the calystic activity of the titanium compound component (A) is further promoted, and there does not occur the generation of a by-product, consisting of diethylene glycol, in a large amount. These effects enable the resultant polyester polymer to exhibit a further improved performance such as, for example, thermal stability. The transeterification reaction is preferably carried out at a temperature of 160 to 260° C.

In the present invention, where terephthalic acid is used as an aromatic dicarboxylic acid, the terephthalic acid and dimethyl terephthalate are employed as starting materials for the polyester. In this case, a recycled dimethyl terephthalate obtained by depolymerizing a polyalkylene terephthalate or a recycled terephthalic acid obtained by hydrolyzing the recycled dimethyl terephthalate may be used. It is particularly preferred to use, as the material source for preparation of a polyester, recovered PET bottles, recovered polyester, fiber products and recovered polyester film products, in view of effective utilization of resources.

The polycondensation reaction may be carried out in a single rector or successively conducted in a plurality of reactors. The polyester polymer produced by the above-mentioned polycondensation procedure is usually extruded in a melt state into a filamentary form, and the filamentary melt stream of the polyester polymer is cooled and then shaped (cut) into a chip form.

The polyester polymer obtained by the polycondensation procedure is optionally further subjected to a solid phase polycondensation procedure.

The solid phase polycondensation procedure is carried out at one or more stages, at a temperature of 190 to 230° C., under a pressure of 1 kPa to 200 kPa, in an inert or unreactive gas atmosphere comprising, for example, nitrogen, argon and/or carbon dioxide gas.

The polyester polymer produced by the above-mentioned solid phase polycondensation procedure and in the form of chips is further treated with water by contacting water vapor-containing air with the polymer, to deactivate the catalyst contained in the polymer chips.

The procedure for producing the polyester polymer comprising the esterification step, and the polycondensation, step may be carried out in any one of batch, semi-continuous and continuous type procedures.

The polyester polymer usable for the present invention is preferably selected from ployethylene terephthalate, polytrimethylene terephthalate, and polytetramethylene terephthalate.

The polyester polymer usable for the present invention preferably has an L* value of 77 to 85 and a b* value of 2 to 5, determined in accordance with the L*a*b* color specification of JIS Z 8729.

The polyester polymer produced by the above-mentioned procedures and usable for the present invention preferably has an intrinsic viscosity in the range of from 0.40 to 0.80, more preferably from 0.50 to 0.70. If the intrinsic viscosity is less than 0.40, the resultant polyester fibers may exhibit an insufficient mechanical strength. Also, if the intrinsic viscosity is more than 0.80, it may be necessary to design the intrinsic viscosity of the starting polyester polymer to be very high, and this may cause an economical disadvantage.

The polyester polymer usable for the present invention optionally a small amount of an additive, for example, an antioxidant, an ultraviolet ray-absorber, a flame detardent, a fluorescent brightening agent, a dulling agent, a color tone-controlling agent, a defoaming agent, an antistatic agent, antibacterial agents, a light stabilizer, a thermal stabilizer and a light-screening agent. Particularly, the polyester polymer is preferably added with titanium dioxide as a dulling agent and an antioxidant as a stabilizer.

The titanium dioxide is preferably in the form of particles having an average particle size of 0.01 to 2 μm and is preferably contained in a content of 0.01 to 10% by mass in the polyester polymer.

In the case where the polyester polymer contains titanium dioxide as a dulling agent and only the dulling agent consisting of titanium dioxide is removed from a sample of the polyester polymer to be subjected to a measurement, the sample of the polyester polymer is dissolved in hexafluoroisopropanol, the solution is subjected to a centrifugal separation testament to separate and precipitate the particles of titanium dioxide from the solution, an upper clear liquid fraction of the solution is collected by a tilting method, and the solvent is evaporated away from the collected liquid fraction, to provide a polymer sample to be subjected to the measurement.

The antioxidant preferably comprises a hindered phenolic antioxidant. The antioxidant is contained in a content of 1% by mass or less, more preferably 0.005 to 0.5% by mass in the polyester polymer. If the content of the antioxidant is more than 1% by mass, the anti-oxidation effect of the resultant resin may be saturated and too high a content of the antioxidant may cause scum to be generated in the polyester polymer melt during the melt spinning procedure. Also, the hindered phenolic antioxidant may be employed in a combination with a thioether antioxidant against a secondary oxidation.

There is no limitation to the manner of mixing the antioxidant into the polyester polymer. The mixing procedure may be carried out in any stage between the start of the transesterification reaction and the end of the polycondensation reaction.

In the present invention, there is no limitation to the process for producing the fibers from the polyester polymer, and the conventional polyester melt-spinning process can be used for the polyester fiber. For example, the above-mentioned polyester polymer is melted at a temperature in the range of from 270 to 300° C., and the melt is melt spun. In this melt-spinning procedure, the melt-spinning speed is preferably 400 to 5000 m/min. When the melt-spinning procedure is carried out at a speed in the above-mentioned range, the resultant filaments may exhibit a sufficient mechanical strength and may be wound-up in a stable condition. The resultant undrawn polyester filaments are wound-up and then subjected to a drawing procedure or are continuously subjected to the drawing procedure without winding-up. The polyester fibers for the present invention may be subjected to a mass-reduction treatment with an alkali, to improve the hand of the filaments.

In the production of the polyester fibers, there is no limitation to the form of the spinneret. The spinning orifices may have a circular or irregular cross-sectional profiles, for example, a triangular or another polygonal or flat cross-sectional profile and may be for hollow or non-hollow filaments.

There is no limitation to the form of the polyester fibers usable for the present invention. The polyester fiber for the present invention may be in the form of continuous filaments or staple fibers. The polyester fibers usable for the present invention may be in the form of twisted fiber yarns or non-twisted fiber yarns. Further, the polyester fibers usable for the present invention may be in the form of false-twist textured fiber yarns, taslan-textured fiber yarns or fiber yarns interlaced by an interlacing method using air jet streams.

The total thickness, individual fiber thickness of the polyester fiber yarns for the present invention and the cover factor (CF) of the knitted or woven fabric of the present invention may be established in response to the use thereof. The cover factor (CF) of the fabric is defined by the following equation.

$$CF = (DW_p/1.1)^{1/2} \times MW_p + (DW_f/1.1)^{1/2} \times MW_f$$

in which $DW_p$ represents a total thickness in dtex of the warp yarns of the fabric, $MW_p$ represents a weave density in yarns/2.54 cm of the warp yarns, $DW_f$ represents a total thickness in dtex of the weft yarns and $M_f$ represents a weave density in yarns/2.54 cm of the weft yarns.

For example, when the polyester fiber knitted or woven fabric of the present invention is prepared for clothes for gentlemen and ladies, clothes for sports and for uniforms, the polyester fiber yarns are preferably designed to have a total thickness of 33 to 330 dtex, and an individual fiber thickness of 0.4 to 10.0 dtex and the polyester fiber fabric is preferably designed to have a CF of 1000 to 3500. When the fabric is used for materials for interiors, the fiber yarns preferably have a total thickness of 22 to 1100 dtex and an individual fiber thickness of 0.4 to 22 dtex and the fabric preferably has a CF of 1000 to 4500.

In the polyester fiber knitted or woven fabric of the present invention, the content of the polyester fibers is preferably 50% by mass or more, more preferably 60% by mass or more, still more preferably 100% by mass, based on the total mass of the knitted or woven fabric. In the polyester fiber knitted or woven fabric of the present invention, the fibers contained in addition to the polyester fibers are not limited to specific types of fibers, as long as the additional fibers are appropriate to form the knitted or woven fabric. The additional fibers may be at least one type of fibers selected from vegetable fibers, for example, cotton and hemp fibers; animal hair fibers, for example, wool, Angora wool, cashmere, mohair, camel-hair and alpaca-hair; animal fibers, for example, silk, down and feather fibers; regenerated and semisyntheitc fibers, for example, rayon and cellulose acetate fibers; and synthetic fibers, for example, nylon, aramide, polyvinyl alcohol, polyvinyl chloride, polyethylene terephthalate, polytrimethylene terephthalate, polybutylene terephthalate, polyacrylate, polylactic acid, polyacrylonitrile, polyethylene, polypropylene, polyurethane, polyphenylenesulfide, polyimide, polyacrylate, ethylene-vinyl alcohol copolymer and polyetherester copolymer fibers.

In the polyester fiber knitted or woven fabric of the present invention, there is no limitation to the knitting and weaving structures, the woven fabrics include known plain; twill and satin weaves.

The polyester fiber woven fabric of the present invention can be produced by a conventional weaving method using the polyester fibers as specified above. Also, polyester fiber woven fabric may be treated by the known mass-reduction treatment with an alkali or the usual dyeing treatment. Also, the polyester fiber woven fabric of the present invention may be treated by a conventional water-absorption, water-repellent, or raising treatment or with conventional function-imparting agents, for example, an ultraviolet ray-screening agent, an antistatic agent, a flame retardant agent, an antibacterial agent, a deodoring agent, a mothproofing agent, a light-regenerating agent, a retroreflecting agent or an anionic ion-generating agent The polyester fiber knitted fabrics of the present invention is not limited to those having specific knitting structure and knitting density. To obtain a polyester fiber knitted fabrics having a good hand, the wale density is preferably 40 to 80 yarns/2.54 cm, more preferably 50 to 70 yarns/2.54 cm, and the course density is preferably 30 to 70 yarns/2.54 cm, more preferably 40 to 65 yarns/2.54 cm.

There is no limitation to the knitting structure of the polyester fiber knitted fabric of the present invention. The knitting structures applicable to the knitted fabric of the present invention include warp knitting structures and circular knitting structures. The tubular knitting structures include ponti romastich, Milano rib stitch, tuck rib stitch, Urakanoko stitch, single pique and double pique structures, the warp knitting structures include single warp knitting structures, for example, kalf, satin, backkalf, queens cord stitch, and sharkskin stitch structures and double warp knitting structures, for example, double russel and double tricot structures.

The polyester fiber knitted fabrics of the present invention can be produced from the polyester fiber yarns as mentioned above by a conventional knitting method. Also, the knitted fabric may be treated by a mass-reduction treatment with an alkali and/or a conventional dyeing procedure. Also, the polyester fiber knitted fabric of the present invention is optionally further treated by a water-absorption, water-repellent and raising treatment or with a function-imparting agent, for example, an ultraviolet ray-screening agent, an antistatic agent, an antibacterial agent, a deodorizing agent, a mothproofing agent, a light-regenerating agent, a retroreflecting agent, and an anionic ion-generating agent.

EXAMPLES

The present invention will be further illustrated by the following examples which are not intended to restrict the scope of the present invention in any way.

In each of Examples 1 to 14 and Comparative Examples 1 to 8, intrinsic viscosity, color tone and metal content of an polyester polymer and the amount of foreign matter deposited and adhered around the spinneret in the melt-spinning procedure (light of the foreign matter layer) are measured by the following measurements.

(1) Intrinsic Viscosity

An intrinsic viscosity (IV) of a polyester polymer was determined from values of the viscosity of a solution of 0.6 g of the polyester polymer dissolved in 50 ml of orthochlorophenol at 35° C. measured at 35° C., by using an Ostwald viscometer.

(2) Color Tone (L* Value and b* Value)

A polyester sample was melted at 290° C. under vacuum for 10 minutes and was formed, on an aluminum plate, into a plate form having a thickness of 3.0±1.0 mm. The resultant plate-shaped polyester test piece was immediately quenched in iced water, dried at 160° C. for one hour and then subjected to a crystallization treatment. The resultant plate-shaped polyester test piece was placed on a white standard plate for regulating a color-difference meter and Hunter's L* value and b* value of the surface of the plate-shaped polyester test piece in accordance with the L*a*b* color specification (JIS Z 8729) was measured by a Hunter's color-difference meter CR-200 manufactured by Minolta Co., Ltd. The L* value means the lightness and the lightness of the test piece increases as the numerical value increases, while the b value represents a yellowness and the yellowness of the test piece increases as the b value increases.

(3) Metal Concentration Analysis

In the measurement of concentrations of titanium and phosphorus atoms in the catalyst in the state of a solution, a sample of the catalyst solution was placed in a cell for a liquid.

When the catalyst is contained in a polyester polymer, a sample of the polyester polymer containing the catalyst was heat-melted on an aluminum plate and a molded specimen having a flat surface was made by a compression press.

The catalyst solution sample or molded specimen was subjected to the metal concentration measurement by using a fluorescent X-ray analysis apparatus, Model 3270, manufactured by Rigaku Denki Kogyo K.K.

(4) Content of Diethylene Glycol (DEG)

A sample of the polyester polymer was decomposed with hydrated hydrazine, and the resultant decomposition product was subjected to a gaschromatographic analysis using a gaschromatograph (model: 363-70, made by K.K. HITACHI SEISAKUSHO) to determine the content (mass %) of diethyleneglycol.

(5) Height of Foreign Matter Layer Deposited on Melt-spinning Spinneret

After a polyester sample was formed into chips, the resultant chips were melted at 290° C. and the melt was melt-spun by extruding through a spinning spinneret with 12 holes having a hole diameter of 0.15 mm at a extrusion rate of 600 m/min., for 2 days. The height of the layer of a foreign matter deposit formed on an outer periphery of the extrusion hole of the spinneret was measured. The larger the height of the layer of the deposit, the more a bending phenomenon of a filament-shaped stream of the extruded polyester melt occurs easily, resulting in decreased formability of the polyester. That is, the height of the layer of the deposit formed on the spinning spinneret is an index of the formability of the polyester.

(6) Tensile Strength and Ultimate Elongation of Fibers

The tensile strength and ultimate elongation of fibers were measured in accordance with the procedure described in JIS L1013.

Example 1

A mixture of 100 parts by mass of dimethyl terephthalate with 70 parts by mass of ethylene glycol was further mixed with 0.009 part by weight of tetra-n-butyl titanate. The resultant mixture was placed in a stainless steel reactor having heating means and pressurizing means, the pressure of the inside of the reactor was increased to 0.07 MPa and the temperature of the mixture was increased into the range of from 140° C. to 240° C., to subject the mixture to a transesterification reaction. Then, the reaction mixture was further mixed with 0.04 part by mass of triethyl phosphonoacetate, and the transesterification reaction was ended. The reaction mixture was moved to a polymerization reactor, heated to a temperature of 290° C., and subjected to a polycondensation reaction under a high vacuum of 26.67 Pa or less. A polyester polymer free from dulling agent and having an intrinsic viscosity of 0.60 and a diethyleneglycol content of 1.5% by mass was obtained.

The resultant polyester polymer was formed into chips and dried by conventional procedures. The dried polymer chips were subjected to a melt-spinning procedure, to produce a undrawn multifilament yarn having a yarn count of 333 dtex/36 filaments. The undrawn filament yarn was subjected to a drawing procedure at a draw ratio of 4.0 to produce a drawn multifilament yarn having a yarn count of 83.25 dtex/30 filaments. The properties of the drawn multifilament yarn are shown in Table 1.

The drawn multifilament yarn was subjected to a circular knitting procedure using a 28 gauge, 38 inch circular knitting machine, to produce a knitted fabric with a smooth structure, a wale density of 52 yarns/2.54 cm and a course density of 60 yarns/2.54 cm. In the knitting procedure, the processability of the polyester multifilament yarn was good and it was judged that it was possible to maintain the process condition stable over a long period of the process.

The resultant knitted grey fabric was dyed by using a high-pressure dyeing machine at a temperature of 130° C., the resultant dyed fabric in wetted condition was subjected to a padding procedure with a antistatic agent and then heat-set at a temperature of 165° C. in a heat-setter. The resultant finished knitted fabric had a smooth structure, a wale density of 48 yarns/2.54 cm and a course density of 55 yarns/2.54 cm.

The resultant polyester fiber knitted fabric has a bursting strength of 590 kPa, laundry dimensional changes of 0.3% in wale direction and 0.5% in course direction and was judged sufficiently usable for under-cloth use.

Referential Example 1

Synthesis of Titanium Trimellitate

A mixture was prepared by mixing titanium tetrabutoxide into a solution of trimellitic anhydride in a concentration of 0.2% by mass in ethyleneglycol in a molar ratio of titanium tetrabutoxide to trimellitic anhydride of ½:1. The mixture was kept in air at a temperature of 80° C. under the ambient atmospheric pressure for a time of 60 minutes to allow titanium tetrabutoxide and trimellitic anhydride to react with each other, and then the resultant reaction mixture was cooled to room temperature and then mixed into acetone in an amount of 10 times that of the reaction mixture, to allow the resultant catalytic reaction product to crystallize and precipitate. The resultant precipitate was separated and collected from the reaction mixture by filtration through a filter paper and dried at 100° C. for 2 hours.

The target reaction product of titanium tetrabutoxide with trimellitic anhydride, namely titanium trimellitate was obtained.

Example 2

Polyester fibers were produced by the same procedures as in Example 1 except that as a titanium compound for a catalyst, the titanium trimellitate produced in Referential Example 1 was employed in an amount of 0.016 part. The measurement results are shown in Table 1.

The polyester multifilament yarn was subjected to a circular knitting procedure using a 28 gauge, 38 inch circular knitting machine, to produce a knitted fabric with a smooth structure, a wale density of 52 yarns/2.54 cm and a course density of 60 yarns/2.54 cm. In the knitting procedure, the processability of the polyester multifilament yarn was good and it was judged that it was possible to maintain the process condition stable over a long period of the process.

The resultant knitted grey fabric was dyed by using a high pressure dyeing machine at a temperature of 130° C., the resultant dyed fabric in wetted condition was subjected to a padding procedure with a antistatic agent and then heat-set at a temperature of 165° C. in a heat-setter. The resultant finished knitted fabric had a smooth structure, a wale density of 48 yarns/2.54 cm and a course density of 55 yarns/2.54 cm.

The resultant polyester fiber knitted fabric has a bursting strength of 590 kPa, laundry dimensional changes of 0.3% in wale direction and 0.5% in course direction and was judged sufficiently usable for under-cloth use.

Examples 3 to 7

Polyester fibers were produced by the same procedures as in Example 1 except that the titanium compound and the phosphorus compound as shown in Table 1 were used in the amounts as shown in Table 1, to provide a catalyst.

The measurement results are shown in Table 1.

The polyester multifilament yarn was subjected to a circular knitting procedure using a 28 gauge, 38 inch circular knitting machine, to produce a knitted fabric with a smooth structure, a wale density of 52 yarns/2.54 cm and a course density of 60 yarns/2.54 cm. In the knitting procedure, the processability of the polyester multifilament yarn was good and it was judged that it was possible to maintain the process condition stable over a long period of the process.

The resultant knitted grey fabric was dyed by using a high pressure dyeing machine at a temperature of 130° C., the resultant dyed fabric in wetted condition was subjected to a padding procedure with a antistatic agent and then heat-set at a temperature of 165° C. in a heat-setter. The resultant finished knitted fabric had a smooth structure, a wale density of 48 yarns/2.54 cm and a course density of 55 yarns/2.54 cm.

The resultant polyester fiber knitted fabric has a bursting strength of 590 kPa, laundry dimensional changes of 0.3% in wale direction and 0.5% in course direction and was judged sufficiently usable for under-cloth use.

Comparative Examples 1 to 3

In each of Comparative Examples 1 to 3, polyester fibers were produced by the same procedures as in Example 1 except that the titanium compound and the phosphorous compounds as shown in Table 1 were used in the amounts as shown in Table 1, to prepare a catalyst.

The measurement results are shown in Table 1.

The resultant polyester multifilament yarn was subjected to the knitting and dyeing procedure. In the knitting procedure, breakages of the polyester multifilament yarn occurred and, in the dyeing procedure, scratch defects were generated on the fabric.

The resultant finished fabric had a plurality of scratch defects and exhibited unsatisfactory appearance and quality.

Comparative Example 4

A mixture of 100 parts by mass of dimethyl terephthalate with 70 parts by mass ethylene glycol was further mixed with 0.064 part by weight of calcium acetate hydrate. The resultant mixture was placed in a stainless steel reactor having heating means and pressurizing means, the presence of the inside of the reactor was increased to 0.07 MPa and the temperature of the mixture was increased into the range of from 140° C. to 240° C., to subject the mixture to a transesterification reaction. Then, the reaction mixture was further mixed with 0.044 part by mass of an aqueous phosphoric acid solution having a concentration of 56% by mass, and the transesterification reaction was ended. The reaction mixture was placed in a polymerization reactor, mixed with antimony trioxide in the amount as shown in heated up to a temperature of 290° C., and subjected to a polycondensation reaction under a high vacuum of 26.67 Pa or less.

The resultant polyester polymer was formed into multifilaments in the same procedures as in Example 1, and then into polyester fiber knitted fabric.

The measurement results are shown in Table 1.

The resultant polyester multifilament yarn was subjected to the knitting and dyeing procedures. In the knitting procedure, the polyester multifilament yarn was frequently broken and in the dyeing procedure, scratch defects were generated on the fabric.

The resultant finished fabric had a plurality of rubbing defects and exhibited unsatisfactory appearance and quality.

TABLE 1

| | | Catalyst components | | | | | | Polyester polymer | | | Polyester fibers | | |
|---|---|---|---|---|---|---|---|---|---|---|---|---|---|
| | | Ti compound | | P compound | | Sb compound | | | Color | | | Ultimate | Height of |
| Example No | | Type | Content (mmol %) | Type | Content (mmol %) | (Sb$_2$O$_3$) (mmol %) | M$_p$/M$_{Ti}$ | M$_{Ti}$ + M$_p$ (mmol %) | Intrinsic viscosity | L* value | a* value | Tensile strength (cN/dtex) | elongation (%) | foreign matter layer (μm) |
| Example | 1 | TBT | 5 | TEPA | 30 | — | 6 | 35 | 0.620 | 79.0 | 3.0 | 3.7 | 27 | 3 |
| | 2 | TMT | 5 | TEPA | 30 | — | 6 | 35 | 0.620 | 80.0 | 2.8 | 3.8 | 26 | 4 |
| | 3 | TMT | 5 | PEE | 30 | — | 6 | 35 | 0.620 | 78.0 | 3.0 | 3.8 | 28 | 4 |
| | 4 | TMT | 3 | TEPA | 15 | — | 5 | 18 | 0.600 | 80.0 | 2.3 | 3.6 | 27 | 2 |
| | 5 | TMT | 7 | TEPA | 50 | — | 7 | 57 | 0.600 | 80.0 | 3.3 | 3.7 | 25 | 4 |
| | 6 | TMT | 5 | TMP | 30 | — | 6 | 35 | 0.600 | 77.0 | 4.0 | 3.6 | 26 | 3 |
| | 7 | Titanium acetate | 5 | TEPA | 30 | — | 6 | 35 | 0.600 | 78.0 | 4.5 | 3.6 | 29 | 4 |
| Comparative Example | 1 | TMT | 5 | TEPA | 90 | — | 18 | 95 | 0.520 | 83.0 | 0.0 | 3.2 | 22 | 4 |
| | 2 | TMT | 9 | TEPA | 100 | — | 11.1 | 109 | 0.600 | 78.0 | 3.0 | 3.7 | 29 | 4 |
| | 3 | TMT | 2 | TEPA | 7 | — | 3.5 | 9 | 0.600 | 80.0 | 2.0 | 3.6 | 27 | 3 |
| | 4 | — | — | — | — | 31 | — | — | 0.620 | 78.0 | 3.0 | 3.9 | 28 | 50 |

Notes for Table 1
TBT: Titanium tetra-n-butoxide
TMT: Titanium trimellitate
TEPA: Triethyl phosphonoacetate
PEE: Carboethoxymethane-diethyl phosphonate ester
THP: Trimethyl phosphate

Example 8

A polyester polymer was produced and, from the resultant polyester polymer, polyester multifilament yarns were produced by the same procedures as in Example 1.

The polyester multifilament yarns were employed in the form of a non-twisted yarn as warp and weft yarns to form a plain weave consisting of the above-mentioned polyester yarns only and having a warp density of 97 yarns/2.54 cm and a weft density of 83 yarns/2.54 cm.

In the preparation step for the weaving procedure, the generation of fluffs on the yarns in the warper is low and, in the weaving step, breakages of the warp yarns due to the generation of fluffs thereon and stoppages of weaving machine due to the insufficient reelability of the weft yarns were few and, thus, the weave-productivity of the yarns was confirmed to be excellent.

The resultant plain weave was subjected to the same dyeing, antistatic agent treatment and heat-setting procedures as in Example 1.

The resultant dyed and heat-set plain weave had a warp density of 109 yarns/2.54 cm and a weft density of 94 yarns/2.54 cm and tear strengths of 1.4N in the warp direction and 1.1N in the weft direction. Also, the laundry dimensional changes of the plain weave were 1.3% in the warp direction and 0.8% in the weft direction.

Example 9

A polyester polymer was produced and from the resultant polyester polymer, polyester multifilament yarns were produced by the same procedures as in Example 2.

The polyester multifilament yarns were employed in the form of a non-twisted yarn as warp and weft yarns to form a plain weave consisting of the above-mentioned polyester yarns only and having a warp density of 97 yarns/2.54 cm and a weft density of 83 yarns/2.54 cm.

In the preparation step for weaving procedures, the generation of fluffs on the yarn in the warper is low and, in the weaving step, breakages of the warp yarns due to generation of fluffs thereon and stoppages of weaving machine due to the insufficient reelability of the weft yarns were few and, thus, the weave-productivity of the yarns was confirmed to be excellent.

Examples 10 to 14

In Examples 10 to 14, polyester polymers were respectively produced and, from the resultant polyester polymer, polyester multifilament yarns were produced by the same procedures as in Examples 3 to 7.

The polyester multifilament yarns were employed in the form of a non-twisted yarn as warp and weft yarns to form a plain weave consisting of the above-mentioned polyester yarns only and having a warp density of 97 yarns/2.54 cm and a weft density of 83 yarns/2.54 cm.

In the preparation step for weaving procedures, the generation of fluffs on the yarn in the warper is low and, in the weaving step, breakages of the warp yarns due to generation of fluffs thereon and stoppages of weaving machine due to the insufficient reelability of the weft yarns were few and, thus, the weave-productivity of the yarns was confirmed to be excellent.

Comparative Examples 5 to 7

In Comparative Examples 5 to 7, polyester polymers were produced and polyester multifilament yarns were produced from the polymers, respectively by the same procedures as in Comparative Examples 1 to 3.

Plain weaves were produced from the polyester multifilament yarns by the same procedures as in Example 8, and the same dyeing procedures as in Example 8 were applied to the plain weaves.

In the preparation step of weaving procedures, the generation of fluffs on the yarn in the warper occurred often. Also, in the weaving step, the breakages of the warp yarns due to the generation of fluffs and the stoppages of the weaving machine due to insufficient reelability of the weft yarns occurred often. The productivity of weaves from the yarns was insufficient.

Comparative Example 8

In Comparative Example 8, a polyester polymer was produced and polyester multifilament yarns were produced from the polymers, by the same procedures as in Comparative Example 4.

Plain weaves were produced from the polyester multifilament yarns by the same procedures as in Example 8, and the same dyeing procedures as in Example 8 were applied to the plain weaves.

In the preparation step of weaving procedures, the generation of fluffs on the yarn in the warper occurred often. Also, in the weaving step, the breakages of the warp yarns due to the generation of fluffs and the stoppages of the weaving machine due to insufficient reelability of the weft yarns occurred often. The productivity of weaves from the yarns was insufficient.

In Examples 15 to 22 and Comparative Examples 9 to 12 as illustrated below, the properties of polyester polymers and polyester fibers were determined by the measurements described below.

(1) Intrinsic Viscosity

An intrinsic viscosity (IV) of a polyester polymer was determined from values of the viscosity of a solution of 0.6 g of the polyester polymer dissolved in 50 ml of orthochlorophenol at 35° C. measured at 35° C. by using an Ostwald viscometer.

(2) Color Tone (L* Value and b* Value)

A polyester sample in the form of pellets was heat-treated and crystallized in a dryer at a temperature of 160° C. for 90 minutes, then an L* value and an a* value of the polyester sample in accordance with L*a*b* color specification (JIS Z 8729) was measured by using a color machine, model: CM-7500, manufactured by Color Machine Co., Ltd.

(3) Metal Concentration Analysis

In the measurement of concentrations of titanium and phosphorus atoms in the reaction product catalyst, a dried catalyst sample was mounted in a scanning electron microscope (Model S570, manufactured by Hitachi Instruments Service Co., Ltd.) and the concentration of titanium and phosphorus atoms in the catalyst was determined by using an energy dispersive X-ray microanalyzer (XMA, Model EMAX-7000, manufactured by Horiba Seisakusho, K.K.) connected to the scanning electron microscope.

In the measurement of the concentration of a residual catalytic metals in the polyester, granular polyester samples were heat-melted on an aluminum plate and a molded specimen having a flat surface was made by a compression press, and then the concentration of the metals in the molded specimen was determined by using a fluorescent X-ray analysis apparatus, Model 3270E, manufactured by Rigaku Denki Kogyo K.K.

(4) Tensile Strength and Ultimate Elongation of Fibers

The tensile strength and ultimate elongation of fibers were measured in accordance with the procedure described in JIS L 1013.

(5) Amount of Foreign Matters Deposited on Spinning Spinneret

After a polyester sample was formed into chips, the resultant chips were melted at 290° C. and the melt was melt-spun by extruding through a spinning spinneret with 12 holes having a hole diameter of 0.15 mm at a extrusion rate of 600 m/min., for 2 days. The height of the layer of a deposit formed on an outer periphery of the extrusion hole of the spinneret was measured. The larger the height of the layer of the deposit, the more a bending phenomenon of a filament-shaped stream of the extruded polyester melt occurs easily, resulting in decreased formability of the polyester. That is, the height of the layer of the deposit formed on the spinning spinneret is an index of the formability of the polyester.

Example 15

Preparation of Titanium Compound:

In a 2 liter three-necked flask equipped with a means for mixing the contents under stirring, 919 g of ethylene glycol and 10 g of acetic acid were charged and the mixture was stirred, and then 71 g of titanium tetrabutoxide was gradually added to the mixture to thereby prepare a transparent solution of the titanium compound in ethylene glycol. Hereinafter, this solution will be referred to as a "TB solution". The titanium concentration of this solution was measured by using fluorescence X-ray. As a result, it was 1.02%.

Preparation of Phosphorus Compound:

In a 2 liter three-necked flask equipped with a means for mixing contents under stirring with heating, 656 g of ethylene glycol was charged, followed by heating to 100° C. with stirring. Upon arrival at the target temperature, 34.5 g of monolauryl phosphate was added and the mixture was dissolved by heating with stirring to obtain a transparent solution. Hereinafter, this solution will be referred to as a "P1 solution".

Preparation of Catalyst:

The temperature of the P1 solution (about 690 g) was controlled to 100° C. with stirring and 310 g of the TB solution was gradually added to the P1 solution and, after the completion of the addition, the resultant reaction mixture was stirred at a temperature of 100° C. for one hour to complete the reaction between the titanium compound and the phosphorus compound. The mixing ratio of the P1 solution to the TB solution was controlled so that the molar ratio of phosphorus atoms to titanium atoms becomes 2.0:1.0. The resultant reaction product existed in the form of a fine precipitate because the reaction product is insoluble in ethylene glycol, and thus the reaction mixture was in the state of white turbidity. Hereinafter, this catalyst dispersion will be referred to as a "TP1-2.0 catalyst".

To analyze the reaction precipitate in the TP1-2.0 catalyst, a portion of the reaction precipitate was used as a sample and the sample was filtered through a filter having a mesh opening size of 5 μm, thereby to collect the reaction precipitate as a solid, and the precipitate was washed with water and dried. The resulting reaction precipitate was subjected to analysis of the element concentration using an XMA analytical method. As a result, it contained 12.0% of titanium and 16.4% of phosphorus. The molar ratio of phosphorus atoms to titanium atoms was 2.1:1.0. Furthermore, the reaction deposit was subjected to solid NMR analysis. As a result, the following results were obtained. In the measurement of C13 CP/MAS (frequency: 75.5 Hz), the disappearance of peaks at chemical shifts in 14 ppm, 20 ppm and 36 ppm derived from the butoxide structure of titanium tetrabutoxide was observed. In the measurement of P-31 DD/MAS frequency: 121.5 Hz), a new chemical shift peak 22 ppm, which has never before been present in monolauryl phosphate, was observed. It was clearly confirmed from these analytical results that the reaction precipitate obtained in this example contains a new product obtained by the reaction between the titanium compound and the phosphorus compound.

In a reactor in which 225 parts by mass of an oligomer (namely an oligomer of terephthalate diester of ethyleneglycol) are contained, a slurry prepared by mixing 179 parts by mass of high purity terephthalic acid into 35 parts by mass of ethylene glycol was fed at a constant supply rate in a nitrogen gas atmosphere at a temperature of 255° C. under the ambient atmospheric pressure, while stirring, and the slurry was subjected to an esterification reaction, while distilling off water and ethyleneglycol produced as by-products of the reaction. Four hours after the start of the esterification reaction, the reaction was completed. In this reaction, the degree of esterification was 98% and the degree of polymerization of the produced oligomer was about 5 to 7.

The oligomer in an amount of 225 parts by mass, produced by the esterification reaction was placed in a polycondensation reaction vessel, and the above-mentioned TP1-2.0 catalyst in an amount of 3.34 parts by mass were placed as a polycondensation catalyst in the reaction vessel. The reaction temperature of the reaction system contained in the reaction vessel was increased stepwise from 255° C. to 280° C. and at the same time the reaction pressure of the reaction system was reduced stepwise from the ambient atmospheric pressure to 60 Pa to proceed the polycondensation reaction while removing water and ethyleneglycol produced, as by-products by the reaction, from the reaction system.

The proceeding degree of the polycondensation reaction was checked by monitoring a load applied to the stirring wings in the reaction system and the reaction was completed when the polymerization degree of the resulting polyester reaches a desired degree. The reaction mixture in the vessel was continuously extruded through an extruding holes of the reaction vessel into a strand form, then the extruded reaction mixture streams were solidified with cooling and then cut to prepare granular pellets having a granule size of about 3 mm.

The properties of the resultant polyethylene terephthalate are shown in Table 2.

The resultant polyester polymer chips were dried and then subjected to a melt-spinning procedure, to produce a undrawn multifilament yarn having a yarn count of 333 dtex/36 filaments. The undrawn filament yarn was subjected to a drawing procedure at a draw ratio of 4.0 to produce a drawn multifilament yarn having a yarn count of 83.25 dtex/36 filaments. The properties of the drawn multifilament yarn is shown in Table 2.

The drawn multifilament yarn was subjected to a circular knitting procedure using a 28 gauge, 38 inch circular knitting machine, to produce a knitted fabric with a smooth structure, a wale density of 52 yarns/2.54 cm and a course density of 60 yarns/2.54 cm. In the knitting procedure, the processability of the polyester multifilament yarn was good and it was judged that it was possible to maintain the process condition stable over a long period of the process.

The resultant knitted grey fabric was dyed by using a high pressure dyeing machine at a temperature of 130° C., the resultant dyed fabric in wetted condition was subjected to a padding procedure with a antistatic agent and then heat-set at a temperature of 165° C. in a heat-setter. The resultant finished knitted fabric had a smooth structure, a wale density of 48 yarns/2.54 cm and a course density of 55 yarns/2.54 cm.

The resultant polyester fiber knitted fabric had a bursting strength of 590 kPa, laundry dimensional changes of 0.3% in wale direction and 0.5% in course direction and was judged sufficiently usable for under-cloth use.

Example 16

A polyester fiber knitted fabric was produced by the same procedures as in Example 15, except that monolauryl phosphate for the catalyst was replaced by monobutyl phosphate, and the amount of the monobutyl phosphate and the process conditions for the preparation of the catalyst were changed to as described below.

Monobutyl phosphate in an amount of 28.3 g was dissolved in 537 g of ethylene glycol by heating. The resultant solution will be referred to as a P2 solution hereinafter. The P2 solution was mixed with 435 g of the TB solution to prepare a reaction product. The mixing ratio of the TB solution to the P2 solution was controlled to 2:1, in terms of molar ratio of phosphate atoms to titanium atoms.

The resultant reaction product will be referred to as a TP2-2.0 catalyst hereinafter.

In the preparation of the reaction product for the catalyst, the reaction temperature was 70° C. and the reaction time was one hour.

To analyze the TP2-2.0 catalyst, a sample of the reaction solution was filtered through a filter having a mesh opening size of 5 µm, thereby to collect the reaction precipitate as a solid and the solid precipitate was washed with water and dried. The element analysis of the reaction precipitate was conducted in the same manner as in Example 15. As a result, the content of titanium was 17.0% by mass, the content of phosphorus was 21.2% by mass, and the molar ratio of phosphorus atoms to titanium atoms was 1.9:1.

The polyester polymer produced by using the catalyst was used for the production of a polyester multifilament yarn in the same procedures as in Example 15. The measurement results are shown in Table 2.

The polyester multifilament yarn was subjected to a circular knitting procedure using a 28 gauge, 38 inch circular knitting machine, to produce a knitted fabric a smooth structure, a wale density of 52 yarns/2.54 cm and a course density of 60 yarns/2.54 cm. In the knitting procedure, the processability of the polyester multifilament yarn was good and it was judged that it was possible to maintain the process condition stable over a long period of the process.

The resultant knitted grey fabric was dyed by using a high pressure dyeing machine at a temperature of 130° C., the resultant dyed fabric in wetted condition was subjected to a padding procedure with a antistatic agent and then heat-set at a temperature of 165° C. in a heat-setter. The resultant finished knitted fabric had a smooth structure, a wale density of 48 yarns/2.54 cm and a course density of 55 yarns/2.54 cm.

The resultant polyester fiber knitted fabric had a bursting strength of 590 kPa, laundry dimensional changes of 0.3% in wale direction and 0.5% in course direction and was judged sufficiently usable for under-cloth use.

Example 17

A polyester fiber knitted fabric was produced by the same procedures as in Example 15, except that in the preparation of the catalyst, the preparation amount of the TP1 solution and the addition amount of the TB solution were changed to as described below.

Monolauryl phosphate in an amount of 31.3 g was dissolved in 594 g of ethylene glycol by heating. The resultant solution will be referred to as a B3 solution hereinafter. The P3 solution was mixed with 375 g of the TB solution to allow them to react with each other and to prepare a reaction product. The mixing ratio of the TB solution to the B3 solution was controlled to 1.5:1, in terms of molar ratio of phosphate atoms to titanium atoms.

The resultant reaction product will be referred to as a TP3-1.5 catalyst hereinafter.

The polyester polymer produced by using the catalyst was used for the production of a polyester multifilament yarn in the same procedures as in Example 15. The measurement results are shown in Table 2.

The polyester multifilament yarn was subjected to a circular knitting procedure using a 28 gauge, 38 inch circular knitting machine, to produce a knitted fabric a smooth structure, a wale density of 52 yarns/2.54 cm and a course density of 60 yarns/2.54 cm. In the knitting procedure, the processability of the polyester multifilament yarn was good and it was judged that it was possible to maintain the process condition stable over a long period of the process.

The resultant knitted grey fabric was dyed by using a high pressure dyeing machine at a temperature of 130° C., the resultant dyed fabric in wetted condition was subjected to a padding procedure with a antistatic agent and then heat-set at a temperature of 165° C. in a heat-setter. The resultant finished knitted fabric had a smooth structure, a wale density of 48 yarns/2.54 cm and a course density of 55 yarns/2.54 cm.

The resultant polyester fiber knitted fabric had a bursting strength of 590 kPa, laundry dimensional changes of 0.3% in wale direction and 0.5% in course direction and was judged sufficiently usable for under-cloth use.

Example 18

A polyester fiber knitted fabric was produced by the same procedures as in Example 16, except that the preparation amount of the TP2 solution and the addition amount of the TB solution were changed to as shown below.

Monobutyl phosphate in an amount of 30.0 g was dissolved in 627 g of ethylene glycol by heating. The resultant solution will be referred to as a P4 solution hereinafter. The P4 solution was mixed with 340 g of the TB solution to allow them to react with each other and to prepare a reaction product. The mixing ratio of the TB solution to the P4 solution was controlled to 3.0:1, in terms of molar ratio of phosphate atoms to titanium atoms.

The resultant reaction product will be referred to as a TP4-3.0 catalyst hereinafter.

The polyester polymer produced by using the catalyst was used for the production of a polyester multifilament yarn in the same procedures as in Example 15. The measurement results are shown in Table 2.

The polyester multifilament yarn was subjected to a circular knitting procedure using a 28 gauge, 38 inch circular knitting machine, to produce a knitted fabric a smooth structure, a wale density of 52 yarns/2.54 cm and a course density of 60 yarns/2.54 cm. In the knitting procedure, the processability of the polyester multifilament yarn was good and it was judged that it was possible to maintain the process condition stable over a long period of the process.

The resultant knitted grey fabric was dyed by using a high pressure dyeing machine at a temperature of 130° C., the resultant dyed fabric in wetted condition was subjected to a padding procedure with a antistatic agent and then heat-set at a temperature of 165° C. in a heat-setter. The resultant finished knitted fabric had a smooth structure, a wale density of 48 yarns/2.54 cm and a course density of 55 yarns/2.54 cm.

The resultant polyester fiber knitted fabric has a bursting strength of 590 kPa, laundry dimensional changes of 0.3% in wale direction and 0.5% in course direction and was judged sufficiently usable for under-cloth use.

Comparative Example 9

A polyester multifilament yarn was produced by the same procedures as in Example 15, except that as a polycondensation catalyst, a solution of 1.3% by mass of antimony trioxide in ethyleneglycol was employed in an amount of 4.83 parts by mass, and the antimony trioxide solution further comprised 0.121 part by mass of a solution of 25% by mass of trimethyl phosphate in ethylene glycol. The measurement results are shown in Table 2. The polyester multifilament yarn was subjected to the knitting and dyeing procedures in the same manner as in Example 15.

In the knitting procedure, the breakages of the yarns occurred often and in the dyeing procedure, scratch defects were often generated on the fabric. Thus the resultant finished fabric exhibited unsatisfactory appearance and quality.

Comparative Example 10

A polyester multifilament yarn was produced by the same procedures as in Example 15, except that as a polycondensation catalyst, the TB solution prepared in Example 15 was employed alone in an amount of 1.03 parts by mass. The polycondensation time was changed to 95 minutes. The measurement results are shown in Table 2.

The polyester multifilament yarn was subjected to the knitting and dyeing procedures in the same manner as in Example 15. In the knitting procedures, the breakages of the yarns occurred and in the dyeing procedure, the scratch defects were generated on the fabric. Thus, the resultant finished knitted fabric exhibited unsatisfactory appearance and quality.

Comparative Example 11

A polyester multifilament yarn was produced by the same procedures as in Example 15, except that, as a polycondensation catalyst, the TB solution and the P1 solution were separately mixed in amounts of 1.03 parts by mass of the TB solution and 2.30 parts by mass of the P1 solution into the polycondensation reaction system for producing the polyester polymer, without reacting the TB solution with the P1 solution. The measurement results are shown in Table 2.

The polyester multifilament yarn was subjected to the knitting and dyeing procedures in the same manner as in Example 15. In the knitting procedures, breakages of the yarns occurred and in the dyeing procedure, scratch defects were generated on the fabric. Thus, the resultant finished knitted fabric exhibited unsatisfactory appearance and quality.

Comparative Example 12

A polyester multifilament yarn was produced by the same procedures as in Example 16, except that, as a polycondensation catalyst, the TB solution and the P2 solution were separately mixed in amounts of 1.03 parts by mass of the TB solution and 2.3 parts by mass of the P2 solution into the polycondensation reaction system for producing the polyester polymer, without reacting the TB solution with the P2 solution.

The measurement results are shown in Table 2.

The polyester multifilament yarn was subjected to the knitting and dyeing procedures in the same manner as in Example 15. In the knitting procedure, breakages of the yarns occurred and, in the dyeing procedure, scratch defects were generated on the fabric. Thus, the resultant finished knitted fabric exhibited unsatisfactory appearance and quality.

direction and a laundry dimensional changes of 1.3% in the warp direction and 0.8% in the weft direction.

Example 20

By the same procedures as in Example 16, a polyester polymer was produced and polyester multifilament yarns were produced from the polyester polymer.

The multifilament yarns in the form of a non-twisted yarn were employed as warp and weft yarns to produce a plain weave consisting of the polyester multifilament yarns only, and having a warp density of 97 yarns/2.54 cm and a weft density of 83 yarns/2.54 cm.

In the preparation step for the weaving procedures, the generation of fluffs on the yarns in the warper is few, and in the weaving step, breakages of the warp yarns due to

TABLE 2

| | | Catalyst | | | Polyester polymer | | Polyester fiber | | |
|---|---|---|---|---|---|---|---|---|---|
| Example No | Type of catalyst | Content of catalyst Ti (ppm)/P (ppm) | Molar ratio of P atoms to Ti atoms | Intrinsic viscosity | Color L* value/ b* value | Tensile strength (cN/dtex) | Ultimate elongation (%) | Height of foreign matter layer formed around spinneret (μm) | |
| Example 15 | TP1-2.0 | 52/64 | 2.0:1 | 0.64 | 81/2.0 | 3.8 | 25 | 4 | |
| 16 | TP2-2.0 | 48/60 | 2.0:1 | 0.64 | 81/2.2 | 3.7 | 23 | 5 | |
| 17 | TP3-1.5 | 32/28 | 1.5:1 | 0.64 | 81/3.0 | 3.7 | 22 | 4 | |
| 18 | TP4-3.0 | 152/260 | 3.0:1 | 0.64 | 81/2.4 | 3.8 | 23 | 7 | |
| Comparative Example 9 | $Sb_2O_3$ | 250 (Sb) | — | 0.64 | 75/2.5 | 3.7 | 24 | 32 | |
| 10 | TB solution | 52/0 | — | 0.64 | 81/8.0 | 3.8 | 24 | 9 | |
| 11 | TB + P1 solutions | 52/56 | — | 0.64 | 81/7.6 | 3.6 | 25 | 9 | |
| 12 | TB + P2 solutions | 52/56 | — | 0.64 | 81/7.9 | 3.5 | 26 | 8 | |

Example 19

By the same procedures as in Example 15, a polyester polymer was produced and polyester multifilament yarns were produced from the polyester polymer.

The multifilament yarns in the form of a non-twisted yarn were employed as warp and weft yarns to produce a plain weave consisting of the polyester multifilament yarns only, and having a warp density of 97 yarns/2.54 cm and a weft density of 83 yarns/2.54 cm.

In the preparation step for the weaving procedures, the generation of fluffs on the yarn in the warper is low, and in the weaving step, breakages of the warp yarns due to generation of the fluffs on the yarns and stoppings of weaving machine due to the insufficient reelability of the weft yarns were few, and thus the weave-productivity of the yarns was excellent.

The resultant plain weave was dyed, treated with an antistatic agent and heat-set by the same procedures as in Example 15.

The resultant weave had a warp density of 109 yarns/2.54 cm and a weft density of 94 yarns/2.54 cm and exhibited tear strengths of 1.4N in the warp direction and 1.1N in the weft generation of fluffs on the yarns and stoppings of weaving machine due to the insufficient reelability of the weft yarns were few, and thus the weave-productivity of the yarns was excellent.

Example 21

By the same procedures as in Example 17, a polyester polymer was produced and polyester multifilament yarns were produced from the polyester polymer.

The multifilament yarns in the form of a non-twisted yarn were employed as warp and weft yarns to produce a plain weave consisting of the polyester multifilament yarns only, and having a warp density of 97 yarns/2.54 cm and a weft density of 83 yarns/2.54 cm.

In the preparation step for the weaving procedures, the generation of fluffs on the yarn in the warper is low, and in the weaving step, breakages of the warp yarns due to generation of fluffs on the yarns and stoppings of weaving machine due to the insufficient reelability of the weft yarns were few, and thus the weave-productivity of the yarns was excellent.

Example 22

By the same procedures as in Example 18, a polyester polymer was produced and polyester multifilament yarns were produced from the polyester polymer.

The multifilament yarns in the form of a non-twisted yarn were employed as warp and weft yarns to produce a plain weave consisting of the polyester multifilament yarns only, and having a warp density of 97 yarns/2.54 cm and a weft density of 83 yarns/2.54 cm.

In the preparation step for the weaving procedures, the generation of fluffs on the yarn in the warper is low, and in the weaving step, breakages of the warp yarns due to generation of fluffs on the yarns and stoppings of weaving machine due to the insufficient reelability of the weft yarns were few, and thus the weave-productivity of the yarns was excellent.

Comparative Example 13

By the same procedures as in Comparative Example 9, a polyester polymer was produced and polyester multifilament yarns were produced from the polyester polymer.

The polyester multifilament yarns were subjected to the same weaving and dyeing procedures as in Example 19.

In the preparation step for the weaving procedures, a large number of fluffs were formed on the yarns in the warper, and in the weaving step, breakages of the warp yarns due to generation of the fluffs on the yarns and stoppings of weaving machine due to the insufficient reelability of the weft yarns occurred frequently, and thus the weave-productivity of the yarns was insufficient.

Comparative Example 14

By the same procedures as in Comparative Example 10, a polyester polymer was produced and polyester multifilament yarns were produced from the polyester polymer.

The polyester multifilament yarns were subjected to the same weaving and dyeing procedures as in Example 19.

In the preparation step for the weaving procedures, a large number of fluffs were formed on the yarns in the warper, and in the weaving step, breakages of the warp yarns due to the generation of the fluffs on the yarns and stoppings of weaving machine due to the insufficient reelability of the weft yarns frequently occurred, and thus the weave-productivity of the yarns was poor.

Comparative Example 15

By the same procedures as in Comparative Example 11, a polyester polymer was produced and polyester multifilament yarns were produced from the polyester polymer.

The polyester multifilament yarns were woven and dyed in same manner as in Example 19.

In the preparation step for the weaving procedures, a large number of fluffs were formed on the yarns in the warper, and in the weaving step, breakages of the warp yarns due to generation of the fluffs on the yarns and stoppings of weaving machine due to the insufficient reelability of the weft yarns frequently occurred, and thus the weave-productivity of the yarns was insufficient.

Comparative Example 16

By the same procedures as in Comparative Example 12, a polyester polymer was produced and polyester multifilament yarns were produced from the polyester polymer.

The polyester multifilament yarns were woven and dyed in same manner as in Example 19.

In the preparation step for the weaving procedures, a large number of fluffs were generated on the yarns in the warper, and in the weaving step, breakages of the warp yarns due to generation of the fluffs on the yarns and stoppings of weaving machine due to the insufficient reelability of the weft yarns frequently occurred, and thus the weave-productivity of the yarns was insufficient.

What is claimed is:

1. A ployethylene terephthalate fiber knitted or woven fabric formed from yarns comprising ployethylene terephthalate fibers which has been produced by polycondensing a terephthalate diester of ethylene glycol in the presence of a catalyst, wherein the catalyst comprises at least one member selected from mixtures (1) and reaction products (2);

(1) the mixtures (1) for the catalyst comprises a titanium compound component (A) mixed with phosphorus compound component (B), in which mixtures (1), the component (A) comprises at least one member selected from the group consisting of (a) titanium alkoxides represented by the general formula (I):

(I)

in which formula (I), $R^1$, $R^2$, $R^3$ and $R^4$ respectively and independently from each other represent a member selected from alkyl groups having 1 to 20 carbon atoms and a phenyl group, m represent an integer of 1 to 4, and when m represents an integer of 2, 3 or 4, the 2, 3 or 4 $R^2$s and $R^3$s may be respectively the same as each other or different from each other, and (b) reaction products of the titanium compounds of the general formula (I) with aromatic polycarboxylic acids represented by the formula (II):

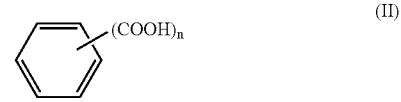

(II)

in which formula (II), n represents an integer of 2 to 4, or anhydrides of the acids of the formula (II); and the component (B) comprising at least one phosphorus compound represented by the general formula (III):

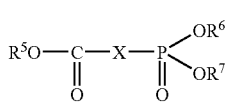 (III)

in which formula (III), $R^5$, $R^6$ and $R^7$ respectively and independently from each other represent an alkyl group having 1 to 4 carbon atoms, X represents a member selected from a —$CH_2$— group and a —CH(Y)— group (wherein Y represents a phenyl group), the mixture (1) for the catalyst for the polycondensation being employed in an amount satisfying the requirements represented by the following expressions of relation (i) and (ii):

$$1 \leq M_P/M_{Ti} \leq 15 \quad (i)$$

and $$10 \leq M_P + M_{Ti} \leq 100 \quad (ii)$$

wherein $M_{Ti}$ represents a ratio in % of a value in milli mole of titanium element contained in the titanium compound component (A) to a value in mole of the aromatic dicarboxylate ester, and $M_P$ represents a ratio in % of a value in milli mole of phosphorus element contained in the phosphorus compound component (A) to the value in mole of the aromatic dicarboxylate ester, (2) the reaction products (2) for the catalyst comprises a component (C) reacted with a component (D), in which reaction products (2), the component (C) comprises at least one member selected from the group consisting of (C) titanium alkoxides represented by the general formula (IV):

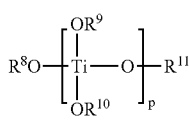 (IV)

in which formula (IV), $R^8$, $R^9$, $R^{10}$ and $R^{11}$ respectively and independently from each other represents an alkyl group having 1 to 20 carbon atoms, p represents an integer of 1 to 3, and when p represents an integer of 2 or 3, 2 or 3 $R^9$s and $R^{10}$s may be respectively the same as each other or different from each other, and (d) reaction products of the titanium alkoxides of the general formula (IV) with aromatic polycarboxylic acids represented by the above-mentioned general formula (II) or anhydride of the acids; and the component (D) comprises at least one phosphorus compound represented by the general formula (V):

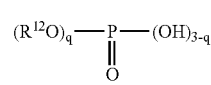 (V)

in which formula (V), $R^{12}$ represents an alkyl group having 1 to 20 carbon atoms or an aryl group having 6 to 20 carbon atoms, and q represents an integer of 1 or 2, and when the fabric is knitted fabric, the knitted fabric has a wale density of 40 to 80 yarns/2.54 cm and a course density of 30 to 70 yarns/2.54 cm, and when the fabric is a woven fabric, the woven fabric has a cover factor (CF) of 1000 to 3500, which cover factor (CF) is defined as follows:

$$CF = (DW_p/1.1)^{1/2} \times MW_p + (DW_f/1.1)^{1/2} \times MW_f$$

wherein $DW_p$ represents a total thickness in dtex of the warp yarns of the fabric, $MW_p$ represents a weave density in yarns/2.54 cm of the warp yarns, $DW_f$ represents a total thickness in dtex of the weft yarns and $MW_f$ represents a weave density in yarns/2.54 cm of the weft yarns.

2. The polyester fiber knitted or woven fabric as claimed in claim 1, wherein in each of the component (A) of the mixture (1) and the component (C) of the reaction products (2) for the catalyst, a reaction molar ratio of each of titanium alkoxides (a) and (c) to the aromatic polycarboxylic acid of the general formula (II) or the anhydride thereof is in the range of from 2:1 to 2:5.

3. The polyester fiber knitted or woven fabric as claimed in claim 1, wherein in the reaction product (2) for the catalyst, a reaction amount ratio of the component (D) to the component (C) is in the range of, in terms of ratio (P/Ti) of the molar amount of phosphorus atoms contained in the component (D) to the molar amount of titanium atoms contained in the component (C), from 1:1 to 3:1.

4. The polyester fiber knitted or woven fabric as claimed in claim 1, wherein the phosphorus compound of the general formula (V) for the reaction product (2) is selected from monoalkyl phosphates.

5. The polyester fiber knitted or woven fabric as claimed in claim 1, wherein the dialkyl terephthalate diester is one produced by a transesterification reaction of a dialkyl ester of an aromatic dicarboxylic acid with ethylene glycol.

6. The polyester fiber knitted or woven fabric as claimed in claim 1, wherein the polyester polymer has an L* value of 77 to 85 and a b* value of 2 to 5, determined in accordance with the L*a*b* color specification of JIS Z 8729.

* * * * *